Jan. 14, 1930.　　S. L. CASELLA ET AL　　1,743,755
SOLDERING MACHINE
Filed Sept. 7, 1927　　6 Sheets-Sheet 5
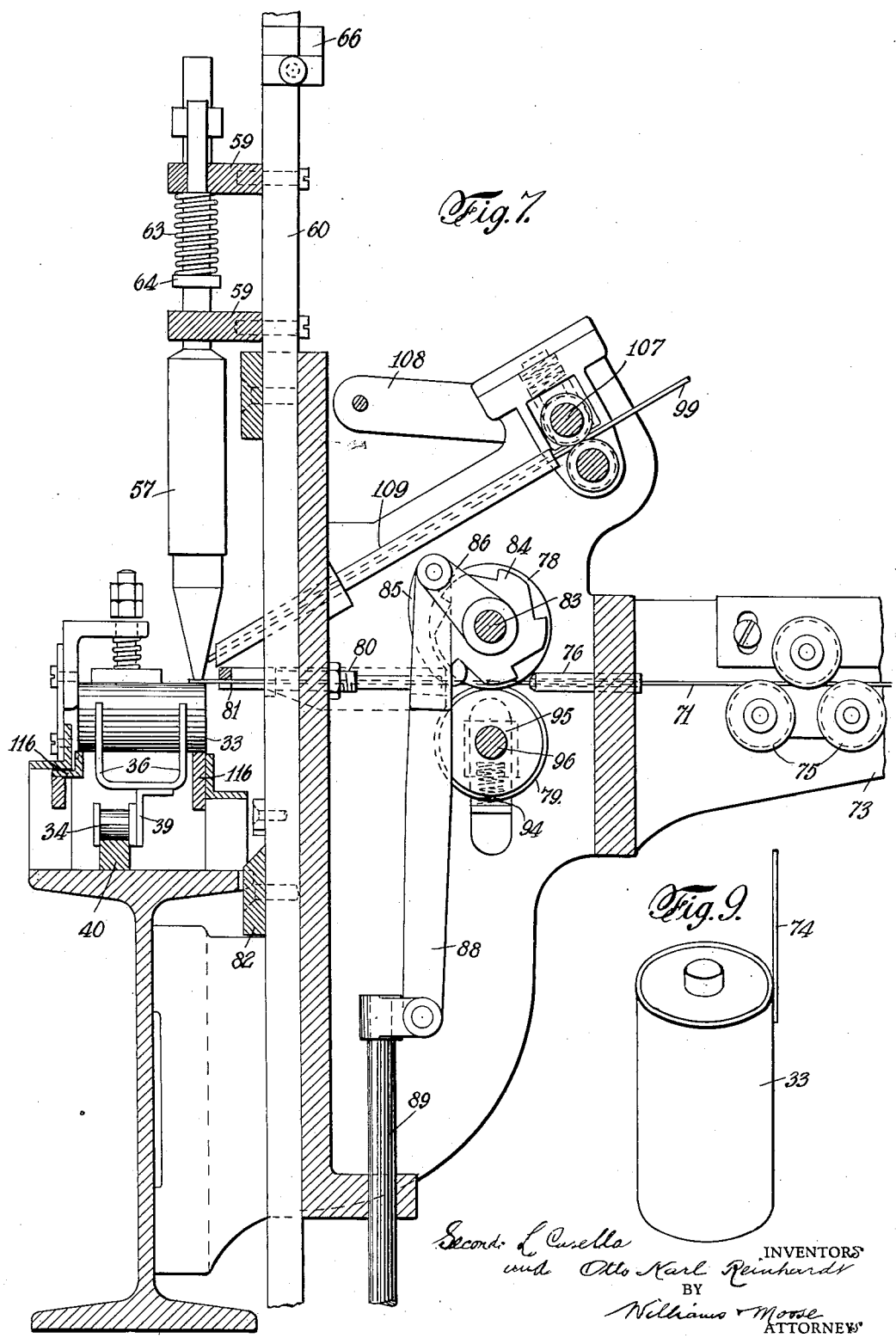

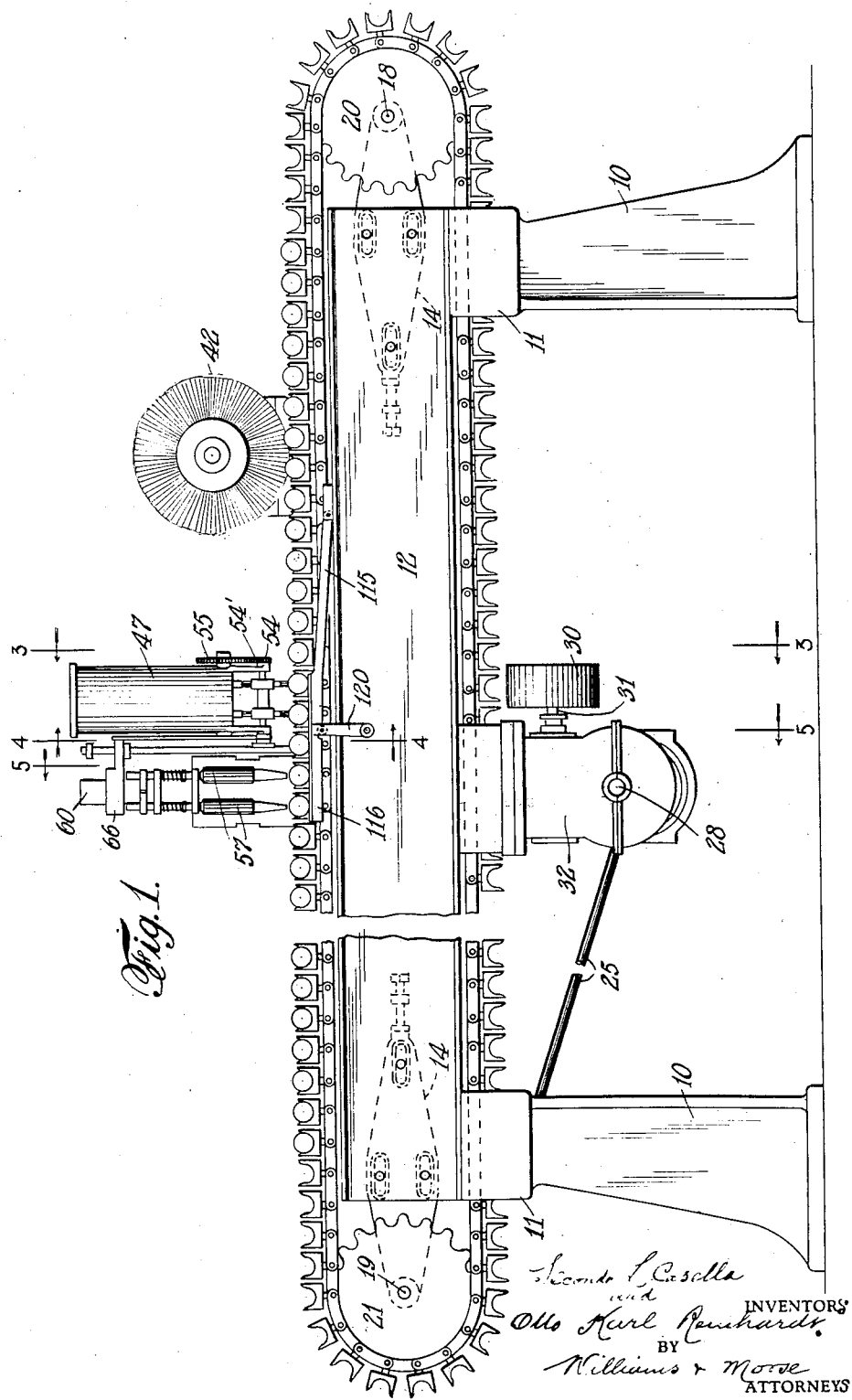

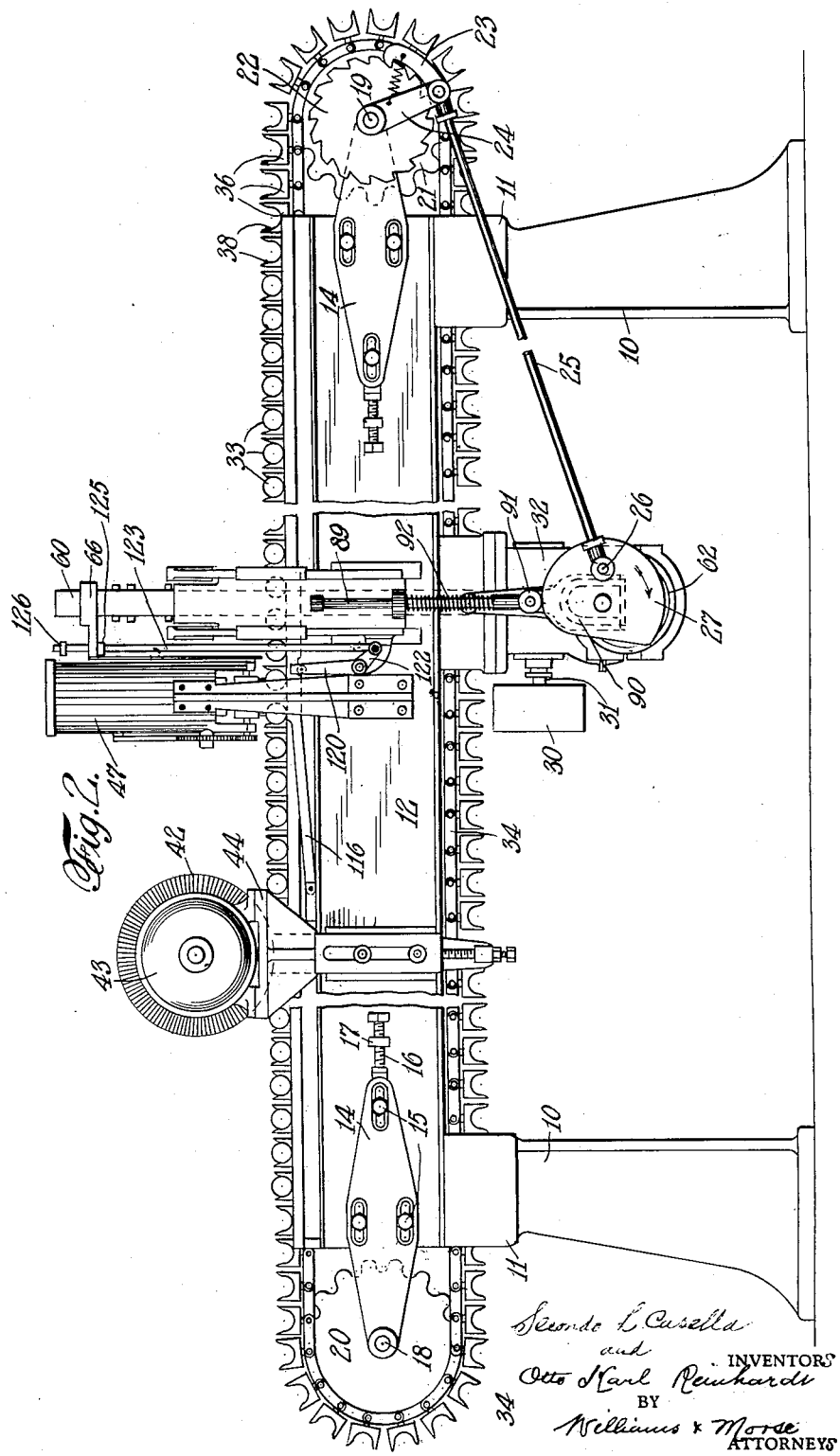

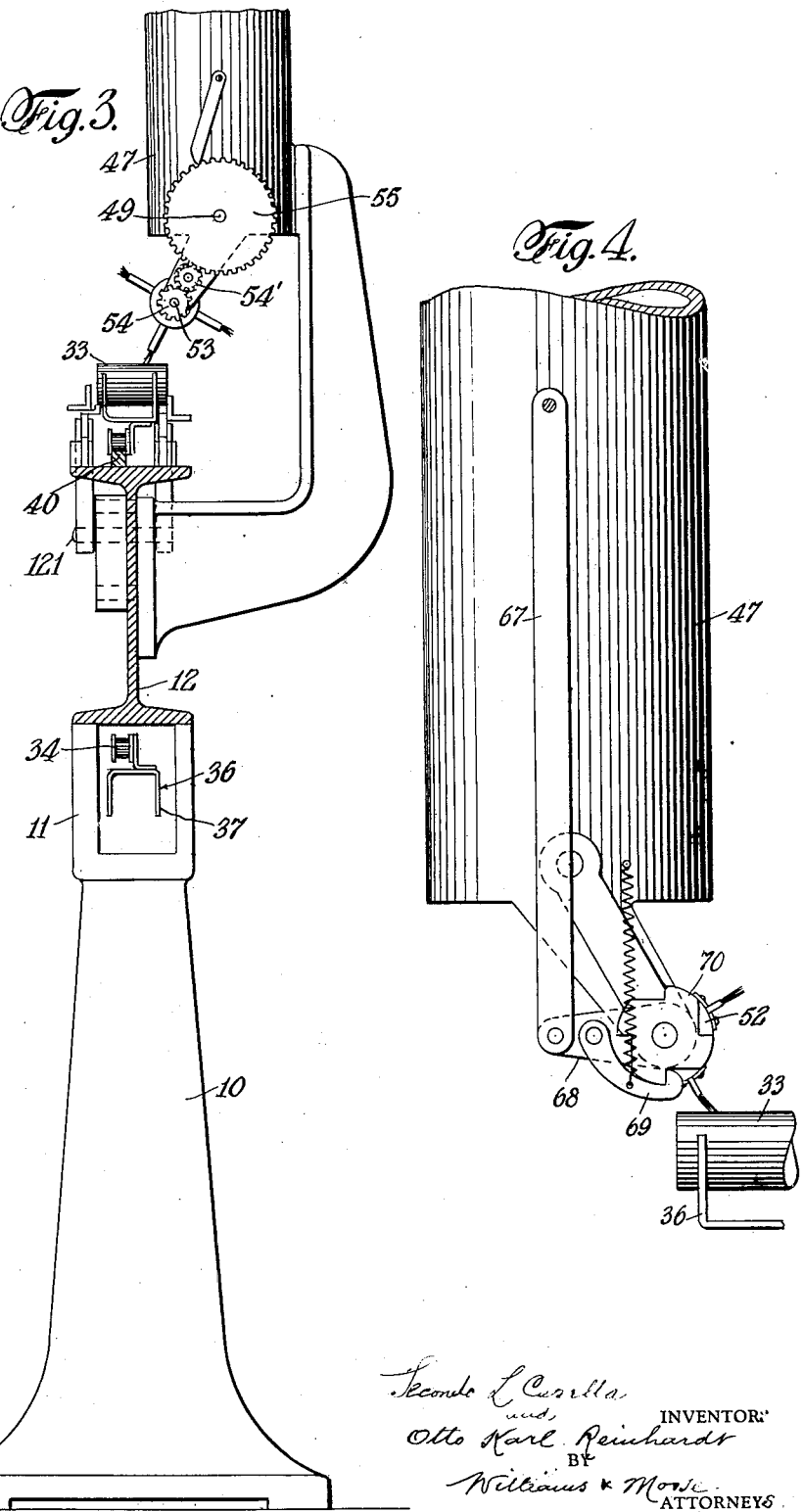

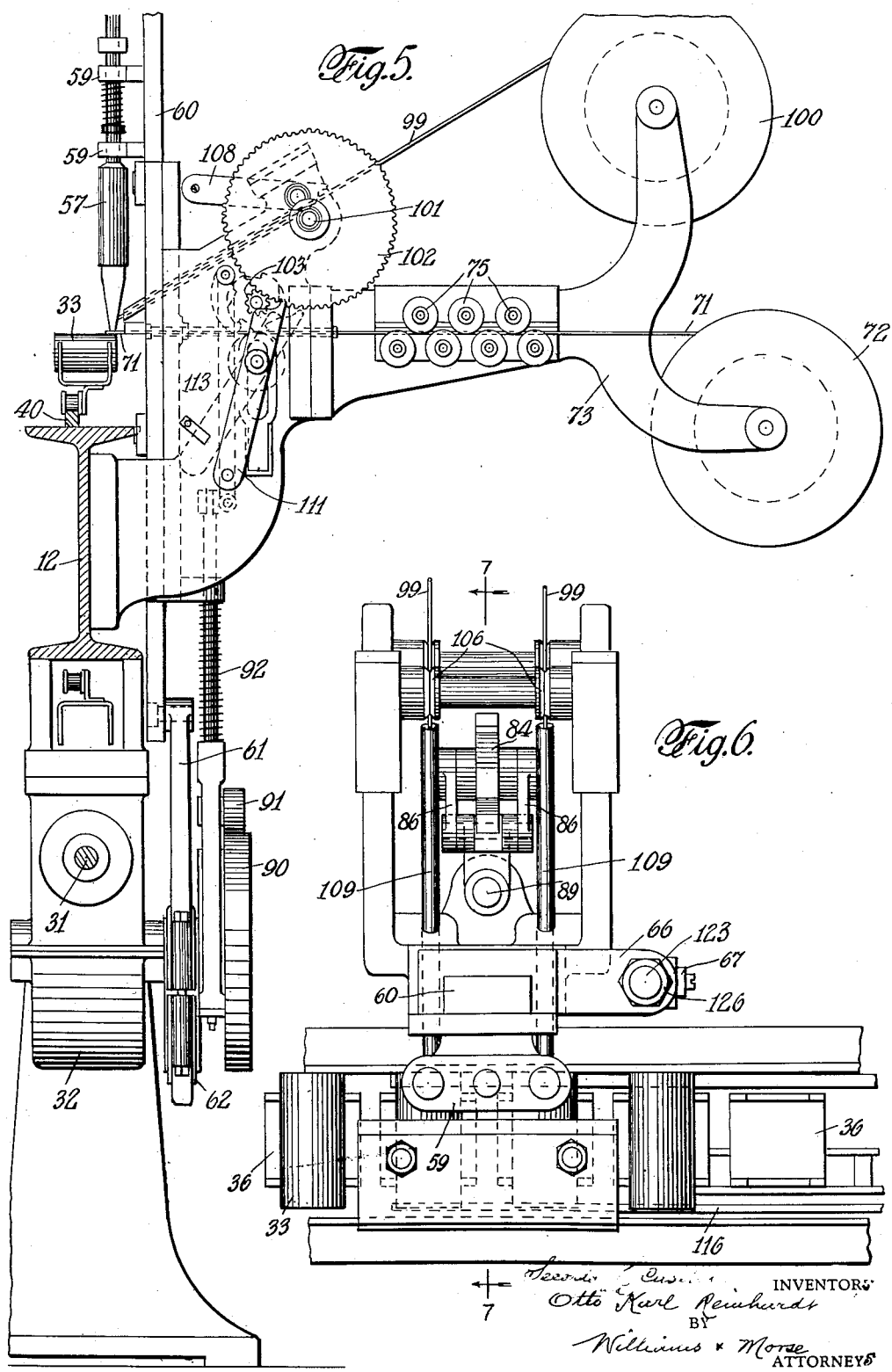

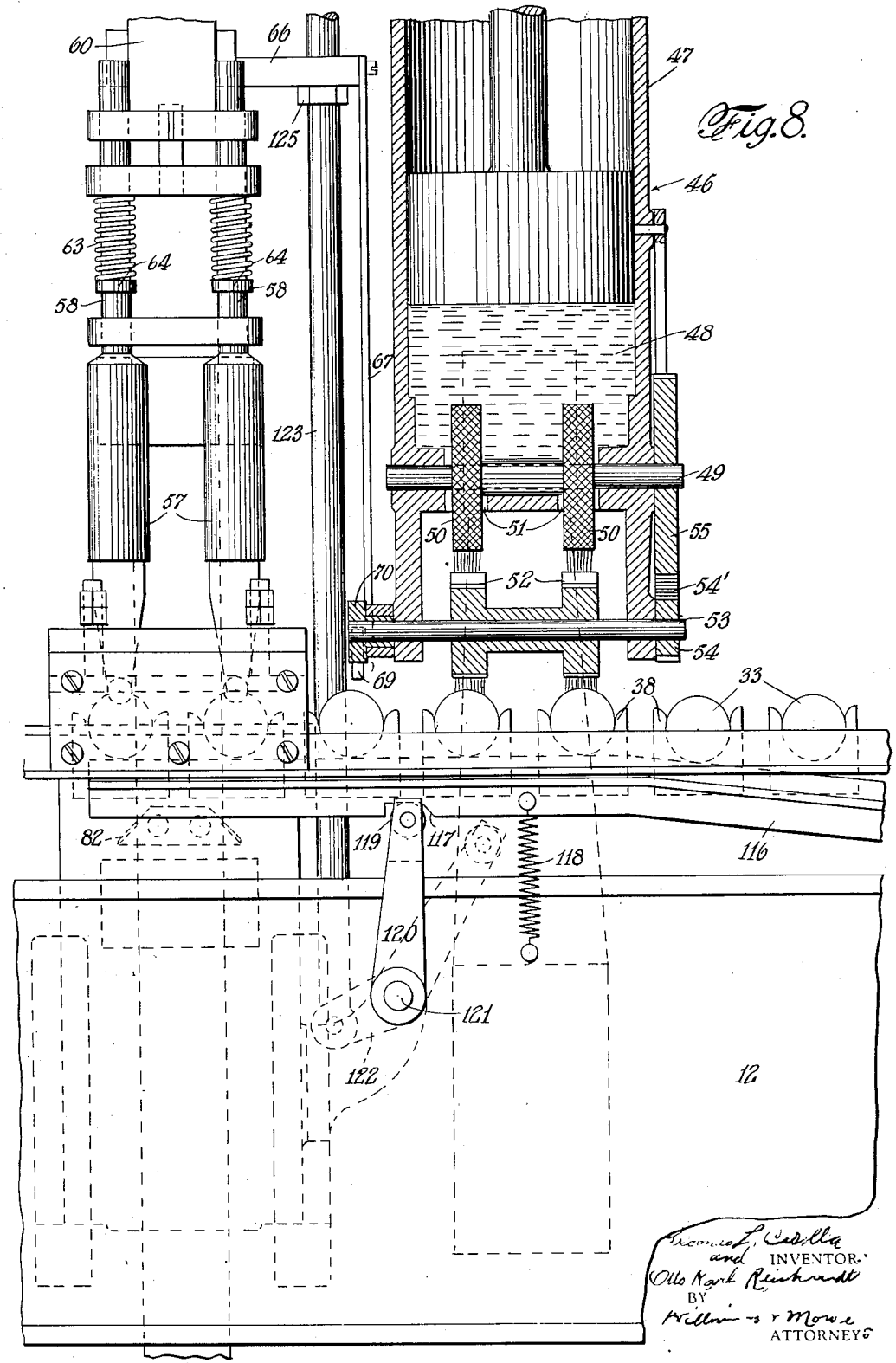

Patented Jan. 14, 1930

1,743,755

UNITED STATES PATENT OFFICE

SECONDO L. CASELLA, OF NEW YORK, AND OTTO KARL REINHARDT, OF JAMAICA, NEW YORK, ASSIGNORS, BY MESNE ASSIGNMENTS, TO BOND ELECTRIC CORPORATION, OF JERSEY CITY, NEW JERSEY, A CORPORATION OF DELAWARE

SOLDERING MACHINE

Application filed September 7, 1927. Serial No. 218,096.

This invention relates to soldering machines and has particular reference to a machine adapted to be used in soldering conductors to the zinc cups or containers of battery cells, with the view to later expediting the work of connecting such cells in series, as, for example, in the manufacture of radio plate batteries.

The general object of the present invention is to provide an improved machine of the character mentioned which is simple in construction, reliable in operation and economical in use.

Other objects and advantages of the invention will become apparent from the following description taken in connection with the accompanying drawings in which—

Figure 1 is a front view of the machine. Figure 2 is a rear view of the machine. Figure 3 is a vertical sectional view taken on the line 3—3 of Figure 1. Figure 4 is a vertical sectional view taken on the line 4—4 of Figure 1. Figure 5 is a vertical sectional view taken on the line 5—5 of Figure 1. Figure 6 is a fragmentary plan view of wire feeding mechanism and solder feeding mechanisms. Figure 7 is a sectional view taken on the line 7—7 of Figure 6. Figure 8 is a fragmentary view, showing in side elevation the endless conveyor and soldering irons and showing in vertical section the flux-applying mechanism. Figure 9 is a perspective view of a container having a conductor soldered thereto.

The supporting frame of the machine includes a pair of pedestals 10, the upper ends of which are formed with spaced side members 11 upon which is supported a longitudinally disposed I-beam 12, serving as an upper frame member to support certain parts of the machine hereinafter to be described.

Each end of the I-beam 12 is provided with a pair of adjustable bearing plates 14 slidably mounted upon a plurality of screws 15. Longitudinal adjustment of the bearing plates 14 may be effected in order to tighten the conveyor, hereinafter to be described, by thrust screws 16 which are mounted in stationary lugs 17 carried by the I-beam 12 and are adapted to engage the inner ends of the bearing plates, as shown most clearly in Figure 2. The outer ends of the bearing plates 14 carry shafts 18 and 19, respectively, to which are connected sprockets 20 and 21, respectively. To the shaft 19 is connected a ratchet wheel 22, adapted to cooperate with a spring pressed pawl 23, carried by an oscillating arm 24 which is journaled upon the shaft 19 and is connected to an operating link 25. This operating link 25 is connected to a pin 26, carried by a cam 27, secured to a main drive shaft 28 which is adapted to be connected to any appropriate source of power through a power pulley 30, power shaft 31 and suitable gears which are housed within a gear box 32 and are not herein shown.

The conveyor for progressively moving the zinc containers 33 through the machine includes a sprocket chain 34 carried by the sprockets 20 and 21, the lower reach of such chain being adapted to pass through the openings afforded between the upwardly projecting side members 11 carried at the upper ends of the pedestals 10, and the upper reach of such chain being supported, as shown most clearly in Figures 3, 7 and 8, upon a track or guide bar 40 mounted upon the upper flange of the I-beam 12. To suitably spaced links of the chain 34 are connected container cradles 36 in which the containers 33 are supported as they are carried through the machine. Each of the cradles 36 includes a U-shaped yoke 37, the arms of which are cut away, as shown in Figures 1, 2 and 8, thus forming pockets 38 within which the containers 33 are adapted to snugly fit. As shown most clearly in Figures 3 and 7, the yokes 37 are connected to the conveyor chain 34 by angle-iron supports or brackets 39.

The containers 33 are placed in the cradles 36 at the right of the machine, as viewed in Figure 1, and are thereafter moved towards the left of the machine, as viewed in that figure, and during such movement they are subjected to the cleaning action of a rotary brush 42 which is driven by a suitable motor 43. As the bristles of the brush wear off and thus become shorter, the brush may be lowered to compensate for such wear, inasmuch as the motor 43 with which the brush 42 is associated is mounted upon a vertically adjustable platform 44 slidably connected to the I-beam 12.

The containers 33, after leaving the brush 42, move into position directly beneath a flux-applying mechanism 46 which is adapted to apply a flux to the previously cleaned surface of the containers. This flux-applying mechanism 46 includes a reservoir 47 adapted for the reception of a suitable flux 48, preferably in paste form. At the bottom of the reservoir 47 is journaled a shaft 49 to which are secured a pair of peripherally knurled delivery discs 50 adapted to operate within openings 51 formed in the bottom of the reservoir 47. As these discs 50 are intermittently rotated, the flux 48 is carried on their knurled peripheral surface to the exterior of the reservoir, and is there removed by the bristles of intermittently rotated flux-applying brushes 52 which are secured to a shaft 53, carrying at one end thereof a pinion 54, which meshes with an intermediate gear 54′ engaging a gear 55 which is secured to the shaft 49. As the brushes 52 rotate, the flux carried thereby is transferred to the containers 33 and applied to the previously cleaned surfaces thereof.

The containers 33, after the application of flux thereto, are moved into position beneath a pair of electrically heated soldering irons 57. These soldering irons are provided with shanks 58 slidably mounted in brackets 59 which are secured to a vertically reciprocating cross head 60 which is connected at its lower end to an eccentric rod 61, mounted upon an eccentric 62, carried by the drive shaft 28. Upon the shanks 58 of the soldering irons are carried springs 63 the lower ends of which engage collars 64 carried by the shanks 58 and the upper ends of which engage the uppermost of the brackets 59. The springs 63, being confined between the collars 64 and the uppermost of the brackets 59, tend to always urge the soldering irons down, but such springs are free to yield after the soldering irons engage the containers thus permitting relative movement between the cross head 60 and the soldering irons as the cross head continues to move downwardly for a short distance after engagement of the soldering irons with the containers has been established.

The containers 33 are presented to the brushes and soldering irons in pairs, the throw of the pawl 23 being such as to intermittently advance the ratchet wheel 22 a sufficient distance to cause the conveyor to intermittently travel the required distance to effect such presentation. Reciprocation of the cross head 60 is utilized to intermittently rotate the delivery discs 50 and flux-applying brushes 52, and in order to accomplish such operation, the cross head 60 is provided with an arm 66 to which is pivotally connected a link 67, the lower end of which is connected to an oscillatory arm 68, journaled upon the shaft 53 and carrying a spring actuated pawl 69, adapted to cooperate with a ratchet wheel 70 secured to the shaft 53. By this arrangement, the shaft 53 is intermittently rotated for each cycle of operation of the cross head 60, with the result that intermittent rotation of the discs 50 is effected through the train of gears 54, 54′ and 55.

The two strands of wire 71, to be soldered to the containers 33 and thereafter severed, are carried upon supply reels 72 mounted upon a bracket 73, supported by the I-beam 12. The strands of wire 71, in travelling to a position to be soldered to the containers and then cut off leaving a relatively short conductor 74, as shown in Figure 9, pass through a plurality of straightening rollers 75, supported on each side of the bracket 73, and thence through a pair of tubular guides 76 also carried by the brackets 73. From the guides 76, the wire passes between an intermittently actuated feed roller 78 and a pressure roller 79. The feed roller 78 is formed with a pair of grooves 78′ adapted to receive the strands of wire 71, and the pressure roller 79 is provided with ribs 79′ which project into said grooves and are there held in contact with the wire by thrust springs 94, cooperating with vertically movable bearings 95 which are mounted in the bracket 73 and in which the shaft 96 of the pressure roller is journaled. In order to facilitate the threading of a new supply of wire 71 through the wire feeding mechanism, the pressure roller 79 is moved down from the feed roller 78, against the influence of the supporting springs 94, by a pair of levers 111. These levers are pivotally connected to the opposite ends of the shaft 96 on which the roller 79 is mounted and their shorter ends are adapted to engage the shaft 83 when the levers are moved from their dotted line positions shown in Figure 5 to their full line position shown therein. Due to the peculiar shape of the upper ends of the levers 111, a camming action is set up between the shaft 83 and such levers as they are moved beyond their full line positions shown in Figure 5, with the result that the pressure roller 79 is depressed a sufficient distance to enable the wire 71 to be threaded through the wire feeding device. After threading wire through the wire feeding device, the levers 111 are moved to their dotted line positions shown in Figure 5, in which positions they are held by holding springs 113 carried upon opposite sides of the brackets. From the feed roller 78 the strands of wire 71 pass through a pair of tubes 80 carried by the bracket 73 and then under a restraining yoke 81 which serves to prevent buckling of the wire to be severed as a shear or cutting tool 82 carried by the cross head 60, engages the wire adjacent the tubes 80 and severs the same as the cross head ascends. The feed roller 78 is mounted upon a shaft 83, carrying a ratchet wheel 84, which is actuated by a pawl 85, pivotally connected to an oscillating arm 86, journaled upon the shaft 83, the oscillating arm 86 being in turn pivoted to a link 88 which is pivotally connected to a reciprocating actuating rod 89. This actuating rod 89 is provided at its lower end with a yoke 90 which straddles the drive shaft 28 and is provided with a cam roller 91 adapted to cooperate with the cam 27 to lift the actuating rod 89 against the influence of a compression spring 92 which serves to move the actuating rod 89 downward as the cam roller 91 passes from a higher to a lower portion of the cam 27. By this arrangement the feed roller 78 is intermittently actuated thus intermittently moving the strands of wire 71 along their respective course to the containers, the advance movement of the strands of wire being such that their free ends come to rest in an overlapping position with respect to the outer end of the container as shown in Figure 7.

Above the wire feeding mechanism, is located a solder feeding device for so feeding two strands of solder 99 towards the containers, that the free ends of such strands are positioned directly below the lower ends of the downwardly moving soldering irons 57. The strands of solder 99 are carried upon supply drums 100 mounted upon the bracket 73, and movement of the solder is accomplished by an intermittently actuated feed roller 101 journaled in the bracket 73, the shaft of the feed roller being connected to a gear 102, meshing with a pinion 103 carried by the shaft 83, which is intermittently rotated by the pawl 84 and ratchet 85 adapted for intermittent operation by the cam 27, as previously described. The strands of solder 99 are maintained in engagement with the feed roller 101 by pressure rollers 106 mounted in vertically movable bearings 107 carried by the bracket 73. To the shaft of the pressure rollers 106 are pivoted a pair of arms 108, the shorter ends of which engage the brackets 73, relatively near the bearing of the feed roller 101, so as to enable the pressure rollers 106 to be readily lifted to facilitate threading of the strands of a new supply of solder through the solder feeding mechanism. The strands of solder 99, when leaving the feeding roller 102, pass through a pair of guide tubes 109 which terminate relatively near the point at which the soldering operations are carried out.

As the containers 33 progress through the machine they move into position beneath the free ends of the strands of wire at a substantial distance therefrom, and in order to thereafter move the containers vertically and thus establish firm contact of the containers with the exposed ends of the strands of wire 71, a suitable elevating mechanism is provided. This elevating mechanism includes a pair of rocker levers 115 pivotally connected to opposite sides of the I-beam 12, each rocker lever being provided with a finger portion 116 having a notch 117 formed therein. The rocker arms 115 are normally held in their lowermost positions by tension springs 118 and are adapted to cooperate with rollers 119 carried by bell crank levers 120, secured to opposite ends of a shaft 121 which projects through the I-beam 12 and carries an arm 122 to which is pivotally connected an actuating rod 123. This actuating rod projects through an opening formed in the arm 66, carried by the cross head 60, so as to permit a certain amount of relative movement between the cross head 60 and the actuating rod 123 as the cross head is vertically reciprocated. As the cross head 60 moves down, the arm 66 engages a collar 125 carried by the actuating rod 123 with the result that such rod is moved down, thereby moving the bell crank lever 120 from its dotted line position shown in Figure 8 to its full line position shown therein, with the result that the levers 115 are elevated, thereby lifting such containers as are in fluxing positions towards the flux-applying brushes and at the same time moving such containers as are ready to be soldered toward the soldering irons 57 and into contact with the free ends of the strands of wire 71. As the containers are lifted into engagement with the free ends of the strands of wire 71, they engage a pressure plate 125' which cooperates with the levers 115 to restrain the containers against tilting or other undue movement when the soldering irons 57 are moved into yielding engagement therewith. The pressure plate 125' is supported upon a bracket 126 and is suspended from such bracket by a pair of rods 127 slidably mounted in one arm thereof and carrying compression springs 127' which serve to retain the pressure plate in firm contact with the containers upon which the soldering operations are being performed. As the bell crank lever 120 moves to its full line position shown in Figure 8, the cam rollers 119 enter their respective notches 117 and serve to hold the levers 115 in their elevated positions until after the cross head 60 has approached the completion of its return movement. As the cross head 60 approaches its uppermost position, the arm 66, carried by such cross head, engages a collar 125 secured to the upper end of the actuating rod 123 whereupon such rod, upon further upward movement of the cross head 60, is lifted, with the result that the bell crank lever 120 is moved to its dotted line position shown in Figure 8, thus permitting the springs 118 to return the levers 115 to their lowermost positions as the cam rollers 119 ride out of their respective notches 117.

In operation, the containers 33 to which the conductors 74 are to be soldered are placed in the cradles at the right of the machine, as viewed in Figure 1, whereupon they are progressively moved towards the left, as viewed in that figure, the movement of the conveyor being such as to present the containers two-by-two to the flux-applying brushes 52 and soldering irons 57, respectively. The containers in their course of travel toward the flux-applying brushes and soldering irons are subjected to the rotary brush 42 which cleans the surface to which the solder is to be applied. As the containers are progressively brought to rest beneath the flux-applying brushes 52, such brushes are rotated, thus transferring flux from the peripheral surface of the delivery disc 50 to the cleansed surface of the containers. After such application of flux, the container beneath the brush at the right, as viewed in Figure 8, is advanced to a position intermediate the soldering iron at the right and the flux-applying brush at the left as viewed in Figure 8, and the other of the containers to which the flux has been applied is advanced to a position directly beneath the soldering iron at the right, as viewed in Figure 8. Upon the next operation of the conveyor, the intermediate container, that is the container shown between the soldering iron at the right and the flux-applying brush at the left, as viewed in Figure 8, is advanced to a position directly beneath the soldering iron at the left, as viewed in Figure 8. As the conveyor is advanced, the strands of wire 71 to be soldered to the containers are progressively presented to such containers and the solder is progressively fed to such a position that the ends of the strands of solder are engaged by the soldering irons as they move to their lowermost positions, a sufficient amount of solder being thus deposited upon the soldering iron to meet the requirements of the soldering operation. After the soldering operation has been carried out, the cross head 60 is returned to its uppermost position and carries with it the soldering irons 57 and the cutting tool 82 which severs the conductors 74 from the strands of wire 71. After the wire is thus severed, the soldered containers, as well as those to which the flux has been immediately applied, are lowered in their respective cradles as the levers 115 drop to their lowermost positions, whereupon the conveyor is again advanced, thus advancing the following containers to flux-applying and soldering positions, respectively, and moving the containers with the conductors attached thereto onward toward the delivery end of the machine.

It is of course to be understood that the machine herein described may be modified in many respects without departing from the spirit of the invention as defined in the claims hereto appended.

What is claimed is:

1. In a machine for soldering a conductor to a container, a soldering iron, intermittently actuated means for periodically moving the soldering iron into and out of soldering position, intermittently actuated solder feeding means for intermittently moving solder into the path of the soldering iron, conductor feeding means operating in synchrony with said solder feeding means for projecting an end of a conductor into soldering position, and intermittently actuated container conveying means operating in synchrony with said solder feeding means for progressively moving containers relatively to said projected end of said conductor and into soldering position adjacent said projected end of said conductor.

2. In a machine for soldering a conductor to a container, a soldering iron, intermittently actuated means for periodically moving the soldering iron into and out of soldering position, intermittently actuated means for moving solder into the path of the soldering iron, conductor feeding means for projecting an end of a conductor into soldering position, means for progressively moving containers relatively to said projected end of said conductor and into a position adjacent said projected end of said conductor, and means for lifting each container to be soldered into contact with the conductor to be soldered.

3. In a machine for soldering a conductor to a container, means for supporting a supply of wire, a soldering iron, means for moving the soldering iron into and out of soldering position, means for advancing solder to a position to be engaged by the soldering iron as the soldering iron is moved into soldering position, means for projecting an end of said wire into soldering position, means for progressively moving a container into soldering position adjacent said projected end of said wire to be there soldered to said wire, and means for severing a length of wire from the strand of wire after soldering to the container.

4. In a machine for soldering a conductor to a container, means for supporting a supply of wire, a soldering iron, means for moving the soldering iron into and out of soldering position, means for advancing solder into the path of the soldering iron between such times as the soldering iron moves out of and into soldering position, means for projecting an end of said wire into soldering position, means for progressively moving containers into soldering position to be there soldered to the projected end of said wire, and means for severing a conductor from the projected end of said wire after each soldering operation.

5. In a machine for soldering a conductor to a container, means for supporting a supply of wire, means for projecting an end of said wire into soldering position, means for supporting a supply of solder, means for projecting an end of said solder into a position adjacent the projected end of said wire, a conveyor for moving a container into a position adjacent the projected end of said wire, a soldering iron adapted to be moved into and out of soldering position, means for moving said soldering iron into contact with said solder and then into soldering position whereby the projected end of said wire is soldered to said container, and a cutting device operable upon the return movement of said soldering iron to sever a length of wire from the supply thereof after soldering to the container.

6. In a soldering machine, means for supporting a supply of wire, means for projecting an end of said wire into soldering position, means for supporting a strand of solder, means for projecting an end of said strand of solder into a position adjacent the projected end of said wire, an intermittently actuated conveyor for moving a container into a position adjacent the projected end of said wire, a soldering iron adapted to be moved into and out of soldering position, a reciprocating cross head yieldably supporting said soldering iron for moving said soldering iron into contact with said solder and then into soldering position whereby the projected end of said wire is soldered to said container, and a shearing device carried by said cross head and adapted to sever a length of wire from said supply of wire at the soldered end thereof as said soldering iron moves out of soldering position.

7. In a soldering machine, means for supporting a supply of wire, means for projecting an end of said wire into soldering position, means for supporting a strand of solder, means for projecting an end of said strand of solder into a position adjacent the projected end of said wire, an intermittently actuated conveyor for moving a container into a position adjacent the projected end of said wire, a soldering iron adapted to be moved into and out of soldering position, a reciprocating cross head yieldably supporting said soldering iron for moving said soldering iron into contact with said solder and then into soldering position whereby the projected end of said wire is soldered to said container, a shearing device carried by said cross head and adapted to sever a length of wire from said supply of wire at the soldered end thereof as said soldering iron moves out of soldering position, and means cooperating with the soldered end of said wire to prevent distortion thereof as said length of wire is being severed from said supply of wire.

8. In a machine for soldering a conductor to a container, means for supporting a supply of wire, means for projecting an end of said wire into soldering position, means for supporting a supply of solder, means for projecting an end of said solder into a position adjacent the projected end of said wire, a conveyor for moving a container into a position adjacent the projected end of said wire, a soldering iron adapted to be moved into and out of soldering position, means for moving said soldering iron into contact with said solder and then into soldering position whereby the projected end of said wire is soldered to said container, a cutting device operable upon the return movement of said soldering iron to sever a length of wire from the supply thereof after soldering to the container, and means for applying a flux to the container before the soldering operation is performed.

9. In a machine for soldering a conductor to a container, means for supporting a supply of wire, means for projecting an end of said wire into soldering position, means for supporting a supply of solder, means for projecting an end of said solder into a position adjacent the projected end of said wire, a conveyor for moving a container into a position adjacent the projected end of said wire, a soldering iron adapted to be moved into and out of soldering position, means for moving said soldering iron into contact with said solder and then into soldering position whereby the projected end of said wire is soldered to said container, a cutting device operable upon the return movement of said soldering iron to sever a length of wire from the supply thereof after soldering to the container, means for applying a flux to the container before the soldering operation is performed, and means for cleansing the surface of the container before the application of flux thereto.

10. In a soldering machine, means for supporting a supply of wire, an intermittently actuated feed roller for projecting an end of said wire into soldering position, means for supporting a strand of solder, an intermittently actuated feed roller for projecting an end of said strand of solder into a position adjacent the projected end of said wire, a conveyor for moving a container into a position adjacent the projected end of said wire, a soldering iron adapted to be moved into and out of soldering position, a reciprocatory cross head yieldably supporting said soldering iron and adapted to move said soldering iron into contact with said solder and then into soldering position whereby the projected end of said wire is soldered to said container, and a shearing device carried by said cross head and adapted to sever a length of wire from said supply of wire at the soldered end thereof.

11. In a soldering machine, means for supporting a supply of wire, means for projecting an end of said wire into soldering position, a strand of solder, means for projecting an end of said strand of solder into a position adjacent the projected end of said wire, an intermittently actuated conveyor for moving a container into a position adjacent the projected end of said wire, said conveyor including a plurality of cradles, each of which is adapted for the reception of a container, means for moving said soldering iron into contact with said solder and then into soldering position whereby the projected end of said wire is soldered to said container, and means operable upon the return movement of said soldering iron to sever a length of wire from said supply of wire at the soldered end thereof.

12. In a soldering machine, means for supporting a supply of wire, means for projecting the end of said wire into soldering position, a strand of solder, means for projecting an end of said strand of solder into a position adjacent the projected end of said wire, a conveyor for moving a container into a position adjacent the projected end of said wire, means for lifting said conductor into contact with the end of said wire, a soldering iron adapted to be moved into and out of soldering position, means for moving said soldering iron into contact with said solder and then into soldering position whereby the projected end of said wire is soldered to said container, and means operable upon the return movement of said soldering iron to sever a length of wire from said supply of wire at the soldered end thereof.

13. In a soldering machine, means for supporting a supply of wire, means for projecting the end of said wire into soldering position, a strand of solder, means for projecting an end of said strand of solder into a position adjacent the projected end of said wire, a conveyor for moving a container into a position adjacent the projected end of said wire, means for lifting said conductor into contact with the end of said wire, a soldering iron adapted to be moved into and out of soldering position, means for moving said soldering iron into contact with said solder and then into soldering position whereby the projected end of said wire is soldered to said container, means operable upon the return movement of said soldering iron to sever a length of wire from said supply of wire at the soldered end thereof, and means cooperating with said lifting means for gripping said container and holding the same against displacement during the soldering operation.

14. In a soldering machine, means for supporting a pair of strands of wire, means for projecting an end of each strand of wire into soldering position, means for supporting a pair of strands of solder, means for projecting an end of each strand of solder into a position adjacent the projected ends of said strands of wire, a conveyor for moving containers two by two into position adjacent the projected ends of said strands of wire, a pair of soldering irons adapted to be moved into and out of soldering position, means for moving said soldering irons into contact with the projected ends of said strands of solder and then into soldering position whereby the projected ends of said strands of wire are soldered to said containers, and means operable upon the return movement of said soldering irons to sever a length of wire from each of said strands of wire at the soldered ends thereof.

15. In a soldering machine, means for supporting a pair of strands of wire, means for projecting an end of each strand of wire into soldering position, means for supporting a pair of strands of solder, means for projecting an end of each strand of solder into a position adjacent the projected ends of said strands of wire, a conveyor for moving containers two by two into position adjacent the projected ends of said strands of wire, and means for lifting said containers into contact with the projected ends of said strands of wire.

16. In a soldering machine, means for supporting a pair of strands of wire, means for projecting an end of each strand of wire into soldering position, means for supporting a pair of strands of solder, means for projecting an end of each strand of solder into a position adjacent the projected ends of said strands of wire, a conveyor for moving containers two by two into position adjacent the projected ends of said strands of wire, means for lifting said containers into contact with the projected ends of said strands of wire, and yieldable means cooperating with said lifting means for holding said containers against displacement during the soldering operation.

17. In a soldering machine, means for supporting a pair of strands of wire, means for projecting an end of each strand of wire into soldering position, means for supporting a pair of strands of solder, means for projecting an end of each strand of solder into a position adjacent the projected ends of said strands of wire, a conveyor for moving containers two by two into position adjacent the projected ends of said strands of wire, a pair of soldering irons adapted to be moved into and out of soldering position, means for moving said soldering irons into contact with the projected ends of said strands of solder and then into soldering position whereby the projected ends of said strands of wire are soldered to said containers, means operable upon the return movement of said soldering irons to sever a length of wire from each of said strands of wire at the soldered ends thereof, and means for applying flux to said containers prior to the soldering operations.

18. In a soldering machine, means for supporting a pair of strands of wire, means for projecting an end of each strand of wire into soldering position, means for supporting a pair of strands of solder, means for projecting an end of each strand of solder into a position adjacent the projected ends of said strands of wire, a conveyor for moving containers two by two into position adjacent the projected ends of said strands of wire, a pair of soldering irons adapted to be moved into and out of soldering position, means for moving said soldering irons into contact with the projected ends of said strands of solder and then into soldering position whereby the projected ends of said strands of wire are soldered to said containers, means operable upon the return movement of said soldering irons to sever a length of wire from each of said strands of wire at the soldered ends thereof, means for applying flux to said containers prior to the soldering operations, and means for cleaning the surface of said containers preparatory to the application of flux thereto.

19. In a soldering machine, means for supporting a pair of strands of wire, means for projecting an end of each strand of wire into soldering position, means for supporting a pair of strands of solder, means for projecting an end of each strand of solder into a position adjacent the projected ends of said strands of wire, a conveyor for moving containers two by two into position adjacent the projected ends of said strands of wire, a pair of soldering irons adapted to be moved into and out of soldering position, means for moving said soldering irons into contact with the projected ends of said strands of solder and then into soldering position whereby the projected ends of said strands of wire are soldered to said containers, means operable upon the return movement of said soldering irons to sever a length of wire from each of said strands of wire at the soldered ends thereof, and tubular guiding means through which said strands of wire and strands of solder separately pass as such strands are advanced by the first and second named projecting means respectively.

In testimony whereof, we have affixed our signatures to this specification.

SECONDO L. CASELLA.
OTTO KARL REINHARDT.